United States Patent [19]

Beyer et al.

[11] Patent Number: 5,182,761
[45] Date of Patent: Jan. 26, 1993

[54] DATA TRANSMISSION SYSTEM RECEIVER HAVING PHASE-INDEPENDENT BANDWIDTH CONTROL

[75] Inventors: Donald R. Beyer, Bartlett; Matthew R. Miller; Krsman Martinovich, both of Schaumburg, all of Ill.

[73] Assignee: Motorola, Inc., Schaumburg, Ill.

[21] Appl. No.: 649,083

[22] Filed: Jan. 31, 1991

[51] Int. Cl.[5] ............................................. H03D 3/24
[52] U.S. Cl. ..................................... 375/119; 375/81
[58] Field of Search .................. 375/119, 81, 120, 114; 328/55, 72, 155; 370/105.3; 331/17, 1 A; 307/262, 521

[56] References Cited

U.S. PATENT DOCUMENTS

| | | | |
|---|---|---|---|
| 3,668,315 | 6/1972 | Heitzman | 375/119 |
| 4,313,089 | 1/1982 | Predina | 328/155 |
| 4,339,823 | 7/1982 | Predina et al. | 375/20.12 |
| 4,400,817 | 8/1983 | Sumner | 375/119 |
| 4,451,930 | 5/1984 | Chapman et al. | 455/260 |
| 4,516,083 | 5/1985 | Tumey | 331/1 A |
| 4,546,486 | 10/1985 | Evans | 375/119 |
| 4,574,243 | 3/1986 | Levine | 375/120 |
| 4,683,445 | 7/1987 | Erickson | 331/25 |
| 4,771,249 | 9/1988 | Burch et al. | 331/1 A |
| 4,920,320 | 4/1990 | Matthews | 307/262 |

*Primary Examiner*—Curtis Kuntz
*Assistant Examiner*—T. Ghebretinsae
*Attorney, Agent, or Firm*—Joseph P. Krause; Steven G. Parmelee

[57] ABSTRACT

A data transmission system receiver is disclosed which receives a formatted data stream (302) and operates in one of at least a first bandwidth mode and a second bandwidth mode. The formatted data stream (302) comprises a plurality of data edges (108, 110) and is sampled by a first clock signal (320). A plurality of clock edges (102, 104) defining transitions from one logic state to another is used to define "early" and "late" data edge occurrences. These occurrences are accumulated in accumulators (310, 312) and used as inputs to a clock counter (318) which produces a phase-adjusted clock signal (320). Additionally, the data transmission receiver comprises a detector (330) for detecting when a limited data stream (306) is synchronized with the phase-adjusted clock signal (320) and, in accordance with a predetermined algorithm, is able to switch the phase-lock circuit from the first bandwidth mode to the second bandwidth mode.

4 Claims, 2 Drawing Sheets

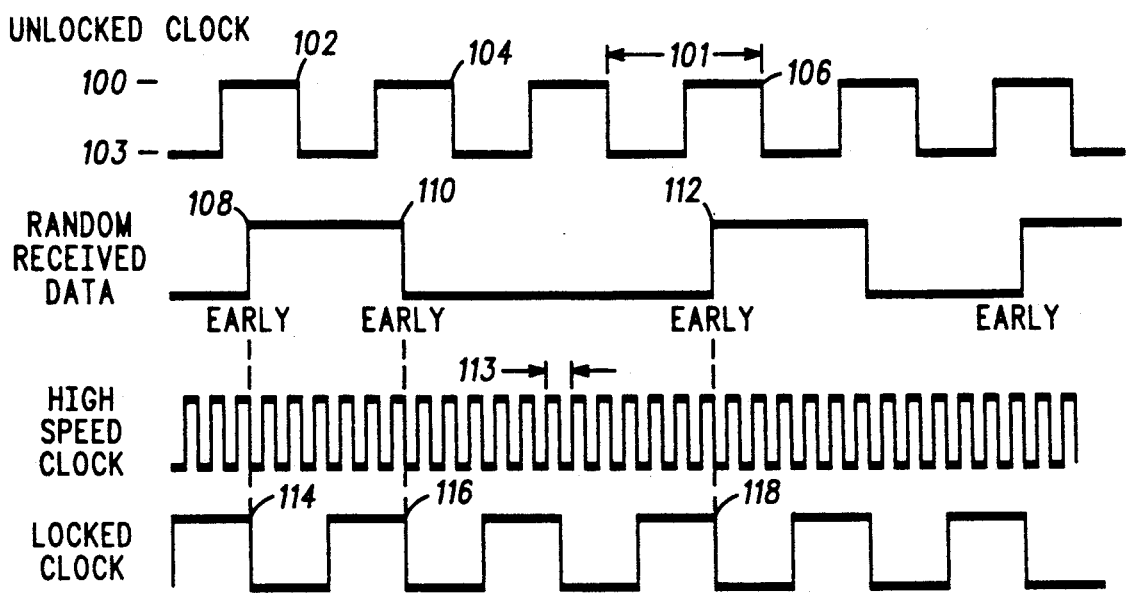
FIG. 1
FIG. 4
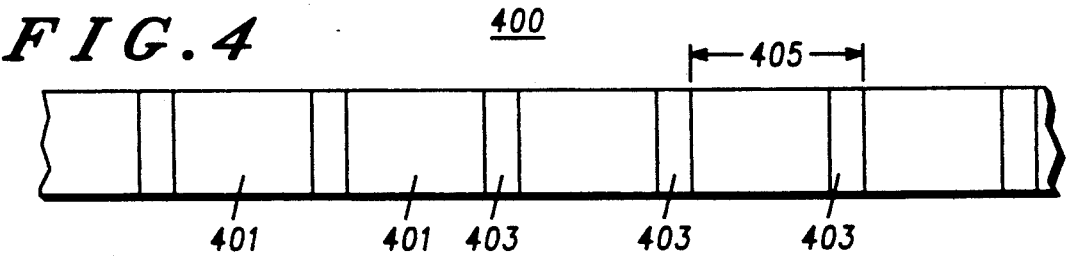
FIG. 2A
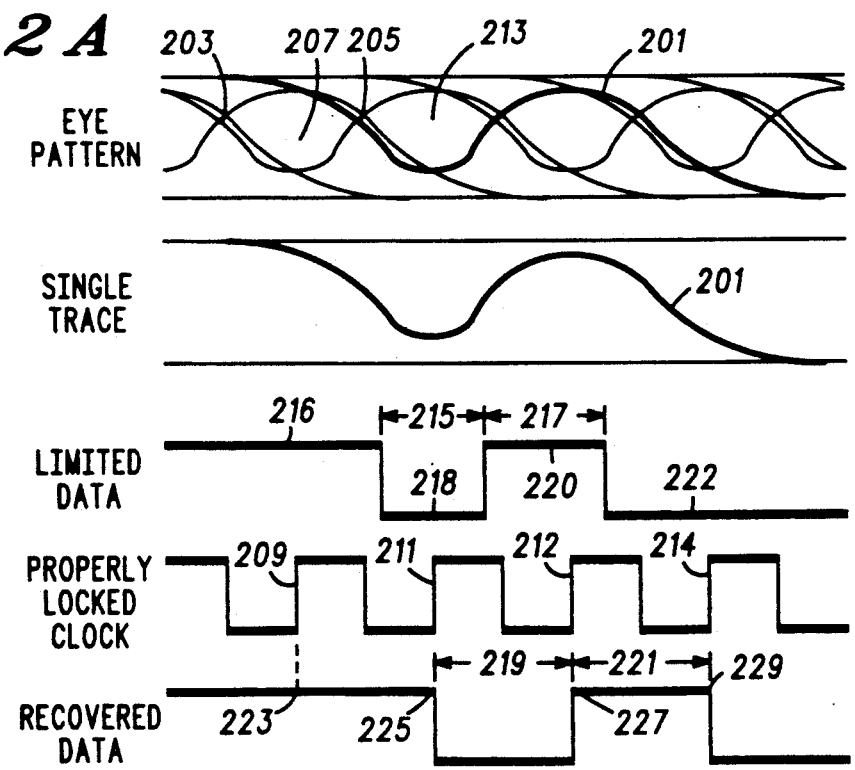

DATA TRANSMISSION SYSTEM RECEIVER HAVING PHASE-INDEPENDENT BANDWIDTH CONTROL

FIELD OF THE INVENTION

This invention relates generally to data transmission system receivers, and more particularly to such receivers using phase-lock circuitry and having decision-based phase-lock bandwidth control.

BACKGROUND OF THE INVENTION

The use of digital data transmission systems to send digitally encoded data, which may be for example, voice data, is well known in the art. Such systems require that the receiving end recover the correct phase of the bit rate clock used at the sending end for timing the data transmission. System of this type generally employ some sort of phase-locked loop (PLL) circuitry in order to perform real-time phase correction. In data transmission systems which operate in noisy environments, a narrow operating bandwidth, or narrow-loop mode, is generally preferred for the PLL. However, in order to ensure a fast initial lock of the local clock to the incoming data signal clock, a wide operating bandwidth, or wide-loop mode, is generally used.

In essence, the most difficult task to be performed in the receiving end of a data transmission system is not synchronizing the incoming data signal with the local clock, but rather the optimization of the transition between the necessary wide-loop mode and the more preferred narrow-loop mode. The operating bandwidth range of a clock recovery system using a PLL circuit is limited at the lower end by transmission clock frequency tolerances and at the upper end by desired receiver locking times.

In today's clock recovery schemes, the transition between PLL bandwidth modes is generally accomplished through the use of data signal edge statistics. Using the edge statistics for a typical type data transmission (i.e., voice data), a predetermined algorithm is invoked in the receiver hardware that forces the bandwidth of the PLL from wide-loop to narrow-loop mode. This type of statistics-based algorithm, which describes the phase variation of the incoming data edges with respect to the receiver clock edges, is generally acceptable where the environment is relatively noise-free. On the other hand, where the data transmission takes place in a noisy environment, the use of the narrow-loop mode becomes even more critical. Therefore, in order for incoming data to be received and decoded in as timely a manner possible, this transition must be optimized to meet all of the aforementioned criterion.

Accordingly, there exists a dire need for a data clock recovery scheme which addresses the need to optimize the transition between the required wide-loop bandwidth mode and the more desired narrow-loop bandwidth mode. Furthermore, the clock recovery scheme must address the additional requirements present in a noisy, or multi-path environment.

SUMMARY OF THE INVENTION

The present invention encompasses a data transmission system receiver which receives a formatted data stream at a predetermined data rate and includes a phase-lock circuit operating in one of at least a first bandwidth mode and a second bandwidth mode. The formatted data stream comprises a plurality of data edges defining transitions between a first logic state and a second logic state. A first clock signal is generated having a frequency substantially equivalent to the predetermined data rate, and comprising a third logic state substantially equivalent in amplitude to the first logic state, and a fourth logic state substantially equivalent in amplitude to the second logic state. A plurality of clock edges defining transitions from the third logic state to the fourth logic state is used to define "early" and "late" data edge occurrences based on a temporal relationship between the plurality of data edges and the plurality of clock edges. These occurrences are accumulated and used as inputs to a clock counter which produces a phase-adjusted clock signal. Additionally, the data transmission receiver comprises means for detecting when a limited data stream is synchronized with the phase-adjusted clock signal and, in accordance with a predetermined algorithm, is able to switch the phase-lock circuit from the first bandwidth mode to the second bandwidth mode.

BRIEF DESCRIPTION OF THE DRAWINGS

FIG. 1 is a timing diagram showing four waveforms whose relatioship serves to describe a typical phase adjusting scheme used in many of today's data transmission systems.

FIG. 2A is a timing diagram showing various waveforms whose relationship serves to describe how a properly locked clock signal, in accordance with the present invention, is able to recover the limited data without introducing bit errors.

FIG. 4 shows a data stream representative of a typical data message signal, in accordance with the present invention.

DETAILED DESCRIPTION OF A PREFERRED EMBODIMENT

Figure 2B:
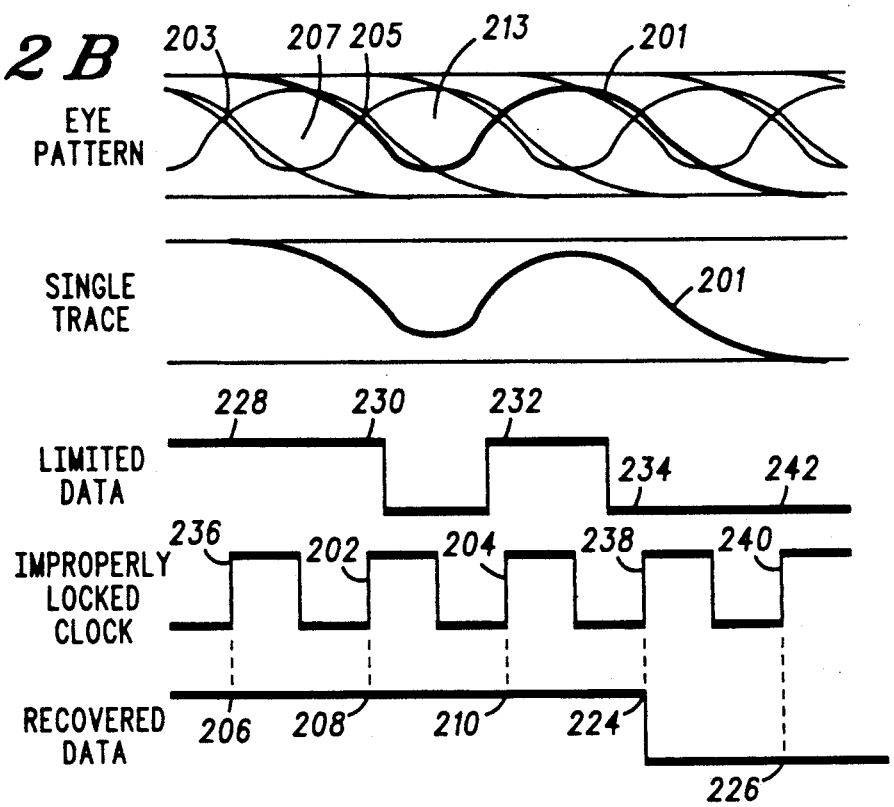
FIG. 2B is a timing diagram showing various waveforms whose relationship serves to describe the consequences of having a recovered clock signal which has been improperly locked with the received limited data.

FIG. 1 shows four waveforms whose relationship will serve to describe a typical phase adjusting scheme used in many of today's data transmission systems. The "Unlocked Clock" waveform represents a local clock signal before any phase adjustment has taken place. The local clock operates at a frequency which is the inverse of the period 101, which may be for example 12 kHz. Logic states 100, 103 represent the relative amplitude of the data within the system, and are hereinafter referred to as "logic high" and "logic low", respectively. Falling clock edges 102, 104 represent the time points in which a transition occurs from a logic high to a logic low, and which ultimately must be aligned with the data edges described below. Referring to the "Random Received Data" waveform, there is shown a limited data signal, which is an amplitude-corrected version of a randomly changing data signal. Data edges 108, 110 are transitory edges used to define a transition from logic high to logic low, and vice-versa. In the preferred embodiment of the present invention, and indeed in most clock recovery schemes, the phase locking mechanism attempts to align these transitory edges with the nearest falling clock edge. As shown in FIG. 1, the transitory edge 108 of the limited data signal is considered "early" with respect to the nearest falling clock edge 102 of the unlocked clock. Similarly, transitory edge 110 is considered "early" with respect to falling clock edge 104 (due to the varying width of the limited data signal bit cells, which is later described in more detail, some transitory edges may be "late", though this case is not shown in FIG. 1). In like manner, all the transitory edges of the limited data signal are recorded as being either "early" or "late" with respect to the nearest falling clock edge. These late and early transitions are then recorded, generally in variable size data buffers, until a predetermined number is reached. In a 12 kbps (i.e., 12 kilo-bits per second) data transmission system, this maximum number may be on the order of 16. Therefore, no phase adjustment to the locally generated clock signal takes place until a minimum of 16 early or 16 late edges are detected.

The "High Speed Clock" waveform represents a second locally generated clock signal having a frequency which is substantially higher than that of the first described clock signal. This frequency is denoted using period 113, the inverse value of which yields the frequency of the high-speed clock. In the preferred embodiment of the present invention, the high speed clock is used to phase adjust the local clock, by advancing or retarding the phase of the recovered clock signal. Advancing the phase is accomplished by subtracting, or snatching, an integral number of high speed clock pulses from the recovered clock signal. This serves to artificially advance the phase of the recovered clock signal by reducing the clock counter threshold value, forcing an earlier transition for the subsequent clock cycle. Similarly, retarding the phase is accomplished by adding, or stuffing, high speed clock pulses to the recovered clock signal. This serves to artificially retard the phase by increasing the clock counter threshold value, forcing a later transition during the subsequent clock cycle. The "Locked Clock" signal shown in FIG. 1 shows the resultant clock signal from such a phase adjustment. Note that falling clock edges 114, 116, are now aligned temporally with transitory edges 108, 110, respectively, on the received data signal.

FIGS. 2A and 2B show various waveforms whose relationship will be used to described the consequences of having a recovered clock signal which has been improperly locked with the received limited data. Generally, such improper locking results in an increased bit error rate for the recovered data. This problem is magnified in a noisy, or multi-path environment, such as that found in a simulcast transmission system.

Referring to FIG. 2A, the "Eye Pattern" shown represents an oscilloscope trace of a received data signal 201 being sampled at a predetermined rate, with each of these samples being superimposed upon each other. Zero-crossings 203, 205 represent the points where the incoming data signal is making a transition between logic levels, for example levels 100, 103. As will be demonstrated in FIG. 2B, it is undesirable to sample the data near these points. Eye-centers 207, 213 represent the mid-point between the zero-crossing points (e.g., eye-center 207 lies mid-way between zero-crossings 203 and 205). It will be demonstrated that these eye-centers represent the optimum sampling point. That is, the leading, or sampling, edges 209, 211 of a properly locked clock signal (shown as the second waveform from the bottom of FIG. 2A) should be temporally aligned with these eye-centers 207, 213 in order to optimize the bit error rate for the receiver. The next waveform, labelled "Single Trace", represents one sample of the received data signal 201, isolated from the other sample data. Through the use of a limiter circuit, the received data signal 201 is amplitude-corrected to yield the squared-off "Limited Data" waveform shown. It should be noted that widths of bit cells 215, 217 may not be equal, which may result from the presence of noise around the zero-crossings, or perhaps the bandwidth limitations of the limiting circuit.

A "Properly Locked Clock" signal, in accordance with the present invention, is shown. Note that the leading edge 211 is aligned with the center of the accompanying bit cell 215. Similarly, leading edge 212 is substantially aligned with the center of the accompanying bit cell 217. This is typically accomplished by first using the aforementioned "stuff and snatch" technique, and then sampling the limited data signal, for example using a common flip-flop.

The leading edges 209, 211, 212, 214 of the recovered clock signal are used to sample the incoming "Limited Data" waveform, creating the "Recovered Data Signal" shown. Leading edge 209 sees a logic high at 216, leaving the recovered signal high at 223. Similarly, leading edge 211 sees a logic low at 218, forcing a transition from high to low at 225. Continuing in like manner, data edges 227 and 229 are generated by sampling edges 212 and 214, respectively. This type of data recovery scheme makes use of the fact that all leading edges of the recovered clock have been aligned with the center points of the associated bit cells in the limited data signal. It should be noted that the width of the recovered bit cells 219 and 221, and all recovered bit cells, are now equal to one full clock cycle.

FIG. 2B shows a set of waveforms similar to those shown in FIG. 2A, with the exception that the recovered clock signal (e.g., second waveform from the bottom) has been improperly locked. A worst-case scenario is presented which shows leading, or sampling, edge 202 being temporally aligned with zero-crossing point 205. In like manner, all the leading edges (e.g., 236, 202) of an improperly locked clock signal may be substantially aligned with an accompanying zero-crossing point (e.g., 203, 205). It is these points where system noise has the most dramatic impact, often resulting in missed data, or bit errors, as next described.

The "Eye Pattern" and "Single Trace" and "Limited Data" waveforms are exactly as shown in FIG. 2A. Referring to the sampling clock, leading edge 236 detects a logic high at 228, leaving the recovered data signal high at 206. Leading edge 202 detects a logic high at 230, leaving the recovered data signal high at 208. Leading edge 204 detects a logic high at 232, leaving the recovered data signal high at 210, and resulting in an undesired bit error. Leading edge 238 then detects a logic low at 234, forcing a transition from high to low in the recovered data signal at 224. Similarly, leading edge 240 detects a logic low at 242, leaving the recovered data signal low at 226. This condition further exemplifies the need to be in a more selective narrow-loop bandwidth mode, in order to combat the ill effects of noise within the data transmission system. Had the data transmission system been able to make a timely transition into narrow-loop bandwidth mode, the clock would have sampled the data closer to the eye-centers, and the aforementioned bit error would have not occurred.

Figure 3:
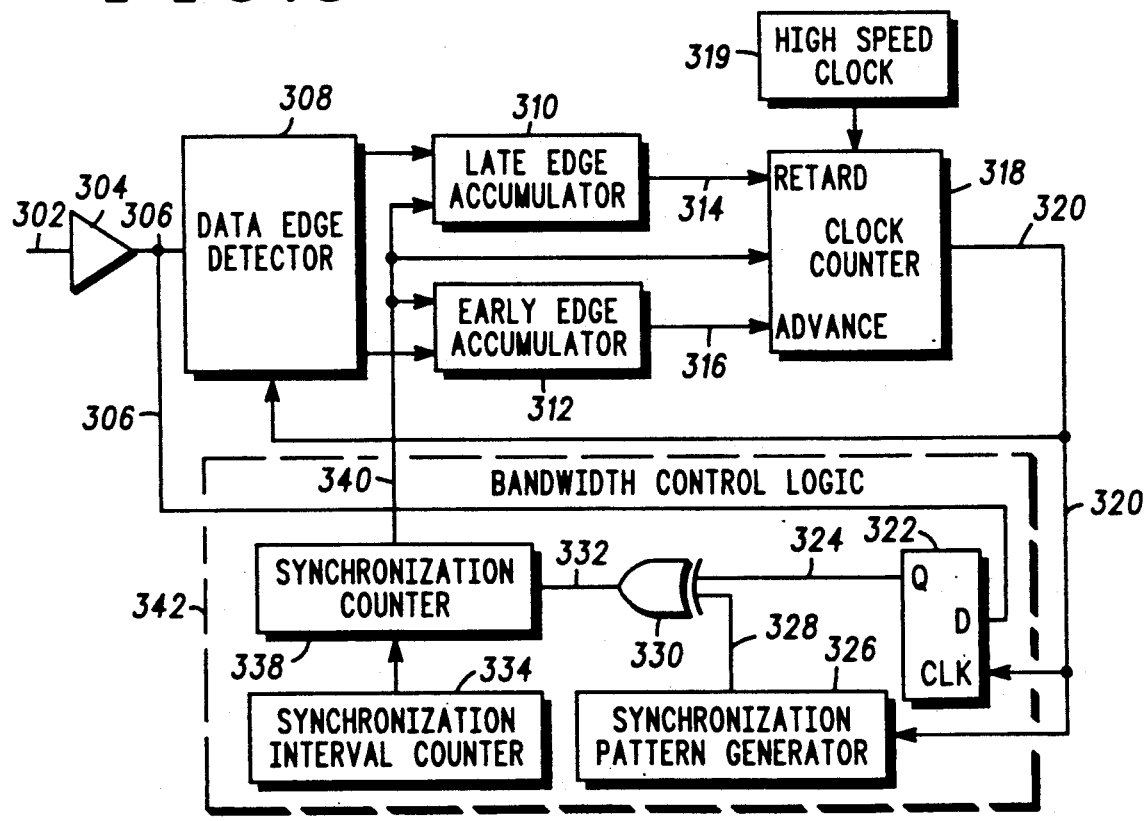
FIG. 3 is a simplified block diagram of a data transmission system receiver, in accordance with the present invention.

FIG. 3 shows a simplified block diagram of a clock recovery circuit 300, in accordance with the present invention. Receive data signal 302 passes through limiter 304 yielding limited data signal 306. This limited data signal 306 is similar to that shown in FIGS. 2A and 2B. Limited data signal 306 then passes to data edge detector 308. At this stage, the occurrences of late edges are counted and recorded in accumulator 310, while occurrences of early edges are counted and recorded in accumulator 312. When accumulator 310 becomes full, line 314 goes high which then instructs the clock counter 318 to retard the recovered clock signal 320. Similarly, when accumulator 312 becomes full, line 316 goes high and instructs the clock counter 318 to advance the recovered clock signal 320. This advancing and retarding of the recovered clock signal is accomplished in clock counter 318 by snatching and stuffing of high frequency clock pulses originating from a high speed clock source 319, which process is described above. Of course, it is the recovered clock signal 320 that is used as the next input to the data edge detector 308 and which also controls the bandwidth control logic 342.

The operation of the bandwidth control logic 342 is such that if the clock is recovered properly, the limited data signal 306 will be sampled near the center of the bit cell, producing a recovered data signal 324 without bit errors. During operation, the recovered clock signal 320 samples the limited data signal 306 through the use of flip-flop 322. The recovered data signal 324 at the output of the flip-flop 322 is then periodically, as determined by the recovered clock signal 320, compared to a synchronization pattern signal 328 through an exclusive-OR gate 330. If the receive data signal 324 is equivalent to the locally generated reference data signal 328 the output 332 of the exclusive-OR gate 330 is a logic low. Otherwise the output 332 of the gate is a logic high. Synchronization interval counter 334 serves to enable the synchronization counter 338, whose operation is later described.

Referring to FIG. 4, there is shown a portion of a typical message data stream 400. Such a signal, in the preferred embodiment of the present invention, comprises a plurality of synchronization patterns 403 interposed among data segments 401 which need to be properly recovered by the receiver. That is, a previously agreed upon synchronization reference pattern is generated at the transmitter and injected into the message data stream 400 at periodic intervals 405. The receiver in turn detects the presence of this synchronization pattern 403 by comparing the synchronization patterns 403 of a received data stream with a locally generated version of the agreed upon synchronization pattern.

Referring back to FIG. 3, if during transmission of the synchronization pattern 403, which is determined by the synchronization interval counter 334, the recovered data bit is equal to the locally generated reference bit 328, then the synchronization counter 338 is incremented. After reaching a predetermined threshold value, the synchronization counter 338 sends the bandwidth control line 340 to a logic high, forcing the clock recovery system into a narrow-loop bandwidth mode. It is this decision-based synchronization detection scheme which allows for an optimized transition between the required wide-loop bandwidth mode and the more desired narrow-loop bandwidth mode. As such, the clock recovery system 300 is much less prone to improper detection of data transitions in the incoming receive data signal 302 due to noise levels in the operating environment.

What is claimed is:

1. A data receiver having a phase lock-circuit for producing a phase-adjusted clock signal, the phase-lock circuit having as its inputs the phase-adjusted clock signal and a formatted data stream being received at a predetermined data rate, the phase-lock circuit operating in one of at least a first bandwidth mode and a second bandwidth mode, the formatted data stream including a periodic synchronization pattern interposed among data segments, the data receiver comprising:

means, coupled to the phase-adjusted clock signal, for sampling the data stream to produce a recovered data signal;

means, coupled to the phase adjusted clock signal, for generating a predetermined synchronization pattern to produce a reference synchronization pattern;

means for comparing the recovered data signal with said reference synchronization pattern to produce a synchronization value; and means, coupled to said means for comparing, for switching the phase-lock circuit between the first bandwidth mode and the second bandwidth mode.

2. A data receiver in accordance with claim 1, wherein said means for switching further comprises counter means for indicating that a predetermined number of said synchronization values has occurred.

3. A data receiver in accordance with claim 2, further comprising means for enabling said counter means during periods when the periodic synchronization pattern is expected.

4. A data receiver having a phase lock-circuit for producing a phase-adjusted clock signal, the phase-lock circuit having as its inputs the phase-adjusted clock signal and a formatted data stream being received at a predetermined data rate, the phase-lock circuit operating in one of at least a first bandwidth mode and a second bandwidth mode, the formatted data stream including a periodic synchronization pattern interposed among data segments, the data receiver comprising:

means, coupled to the phase-adjusted clock signal, for sampling the data stream to produce a recovered data signal;

means, coupled to the phase adjusted clock signal, for generating a predetermined synchronization pattern to produce a reference synchronization pattern;

means for comparing the recovered data signal with said reference synchronization pattern to produce a synchronization value;

counter means coupled to said means for comparing for indicating that a predetermined number of said synchronization values has occurred; and means for enabling said counter means during periods when the periodic synchronization pattern is expected.

* * * * *